US006996624B1

(12) United States Patent
LeCroy et al.

(10) Patent No.: US 6,996,624 B1
(45) Date of Patent: Feb. 7, 2006

(54) RELIABLE REAL-TIME TRANSPORT PROTOCOL

(75) Inventors: Chris LeCroy, Boulder Creek, CA (US); Gregory Vaughan, Santa Cruz, CA (US)

(73) Assignee: Apple Computer, Inc., Cupertino, CA (US)

( * ) Notice: Subject to any disclaimer, the term of this patent is extended or adjusted under 35 U.S.C. 154(b) by 841 days.

(21) Appl. No.: 09/966,489

(22) Filed: Sep. 27, 2001

(51) Int. Cl.
G06F 15/16 (2006.01)
(52) U.S. Cl. .................. 709/231; 709/224; 370/231
(58) Field of Classification Search ............ 709/224, 709/231–233, 236, 352, 392; 370/231, 236, 370/352, 392, 400–401
See application file for complete search history.

(56) References Cited

U.S. PATENT DOCUMENTS

| | | | |
|---|---|---|---|
| 4,963,995 A | | 10/1990 | Lang |
| 5,057,932 A | | 10/1991 | Lang |
| 5,164,839 A | | 11/1992 | Lang |
| 5,262,875 A | | 11/1993 | Mincer et al. |
| 5,440,334 A | | 8/1995 | Walters et al. |
| 5,710,970 A | | 1/1998 | Walters et al. |
| 5,928,331 A | * | 7/1999 | Bushmitch .................. 709/231 |
| 5,963,202 A | | 10/1999 | Polish |
| 5,978,567 A | | 11/1999 | Rebane et al. |
| 5,995,705 A | | 11/1999 | Lang |
| 6,263,371 B1 | * | 7/2001 | Geagan et al. ............... 709/231 |
| 6,643,496 B1 | * | 11/2003 | Shimoyama et al. ......... 455/69 |
| 6,735,634 B1 | * | 5/2004 | Geagan et al. ............. 709/235 |
| 6,741,555 B1 | * | 5/2004 | Li et al. .................... 370/229 |
| 2002/0080721 A1 | * | 6/2002 | Tabagi et al. ............. 370/236 |
| 2002/0167948 A1 | * | 11/2002 | Chen .......................... 370/392 |

FOREIGN PATENT DOCUMENTS

| | | |
|---|---|---|
| AU | B-50399/90 | 8/1990 |
| AU | B-29785/92 | 2/1993 |
| CA | 2006715 | 6/1990 |
| EP | 0407561 B1 | 1/1991 |
| EP | 0757487 B1 | 2/1997 |
| IN | 176213 | 12/1990 |

OTHER PUBLICATIONS

RFC: 1889, "A Transport Protocol for Real-Time Applications", Jan. 1996.
RFC: 2326, "Real Time Streaming Protocol (RTSP)", Apr. 1998.
Burst.com Products retrieved from the Internet: http://burst.com/new/products/main.htm on Nov. 2, 2003.
Burst.com Product Features retrieved from the Internet: http://burst.com/new/products/features.htm on Nov. 3. 2003.
Burst.com Products Methodology retrieved from the Internet: http://burst.com/new/products/methodology.htm on Nov. 3, 2003.

* cited by examiner

*Primary Examiner*—Ario Etienne
*Assistant Examiner*—LaShonda Jacobs
(74) *Attorney, Agent, or Firm*—Buchanan Ingersoll PC

(57) ABSTRACT

Reliability is added to RTP by having a client acknowledge to the server each of the RTP packets received by the client, and retransmitting from the server to the client any of the packets that remain unacknowledged subsequent to expiration of a predetermined time duration subsequent to the timestamp. The server continuously determines a maximum number of bytes that may be contained in the RTP packets streaming into the network and, in the event a number of bytes in the RTP packets exceeds the maximum number, discontinues streaming of the RTP packets until it is determined that the number of bytes is less than the maximum number. The server also continuously determines a present streaming rate at which the RTP packets are streamed into the network wherein the present streaming rate exceeds the normal streaming rate.

152 Claims, 4 Drawing Sheets

RELIABLE REAL-TIME TRANSPORT PROTOCOL

BACKGROUND OF THE INVENTION

1. Field of the Invention

The present invention relates generally to network communication protocols and, more particularly, to an apparatus and method for enhancing reliability of streaming real-time data using the real-time transport protocol.

2. Description of the Related Art

The increase in connection speeds and bandwidth available to clients connecting to the Internet has allowed content providers to provide more multimedia content, in terms of both number of multimedia files and the size of such files, at their respective servers. The high bandwidths offered to clients by services such as cable modems and Digital Subscriber Lines (DSL) are a viable and desirable way to experience high-quality streaming multimedia content. To stream multimedia content over the Internet, a protocol is required as a basis for file transmission between the client and server.

A protocol is a set of rules that clients and servers use to communicate with one another over the Internet. The Internet Protocol (IP) is a packet based data protocol that all of the other current Internet protocols ride on top of. When a client request a file from a server on the Internet, the file is segmented into a plurality of successive packets that the server sequentially sends to the client. As each packet arrives at the client, the client reassembles the packets into a carbon copy of the original file.

In IP, each transmitted packet includes a header, which is a small piece of data minimally containing the IP address of the transmitting server and the IP address of the intended recipient client. The network hardware of the Internet routes the packets among varying paths to their intended destination using the client IP address in the header information. However, IP does not ensure that the packets arrive in the same order at the intended recipient client in which they were sent from the originating server, nor does IP ensure that any such packets arrive at all. Ensuring the delivery of packets to the intended recipient client is the function of the higher level protocols that ride on top of IP.

A protocol that does ensure that all packets arrive at the intended recipient client is the Transmission Control Protocol (TCP), which resides on top of IP and is commonly referred to as TCP/IP. TCP is specifically designed to add reliability and data integrity to the packet based nature of IP. When the client downloads a standard file from the Internet, for example, a software application or text document, TCP requires that incoming packets must be put together in the order they were transmitted from the server to ensure the file can be read or executed properly. If any packets are missing from the downloaded file, the file is corrupt and most likely rendered unusable.

A feature of TCP is that it establishes a temporary direct connection between the intended recipient client and the transmitting server to facilitate that the packets are received in the order they were sent. TCP accomplishes this feature by adding at the server additional header information to outbound packets, basically numbering each of them so the receiving client can determine their proper sequence. Another feature of TCP is that if a packet goes missing, all activity at the recipient client is halted until the missing packet is re-transmitted from the server and received at the client. Accordingly, TCP advantageously provides for retransmission of missing packets.

Although TCP/IP is highly advantageous to download standard data files and executable applications wherein file corruption is not tolerable, the limitation of extra time TCP imposes to retransmit lost packets and also to wait for all packets to arrive disadvantageously renders TCP/IP relatively slow. Another limitation of TCP/IP is that the recipient client must wait until the file being received is completely downloaded before the client can access it, thereby disadvantageously rendering TCP unusable for real-time streaming multimedia content. TCP is inherently limited in this respect since, should any part of the file be missing, the subsequent part of this file is unreadable.

For example, using TCP/IP, the client cannot start downloading multimedia content simultaneously with simultaneous playback being accomplished by a client multimedia player reading the content as it is being downloaded. One known exception to this limitation of TCP/IP exists, which is the ability of certain MP3 players to begin playing MP3 files before they are completely downloaded. However, only the partial file that existed in the client file system as a result of the downloading process at the time the media player was started to read the content can be accessed. The new content that continues to be downloaded while the partial file is being played, although being stored in the client file system, cannot be accessed until the file is reloaded into system memory by restarting the media player to read this file. However, even if our packet remains missing, no packets thereafter can be played or viewed until such packet is retransmitted.

A common protocol that is, however, more adaptable to delivery of multimedia content is the User Datagram Protocol (UDP). Similarly to TCP, UDP rides on top of IP, adds a sequence number to the header information for each packet, and is also commonly be referred to as to UDP/IP. In contrast to TCP, UDP does not establish a direct connection between the server and client. Although the server sequentially transmits packets into the Internet, the connectionless feature of UDP results in packets being received at the intended recipient client not necessarily in the same order as transmitted. As each sequentially numbered packet is transmitted into the Internet, it may be routed along different paths from each other packet, as determined by network congestion. Furthermore, in UDP, some packets may be lost in the network and not received at all.

A primary advantage to using UDP for the delivery of multimedia content is that, in the event that packets are lost, UDP allows the downloaded file to be assembled with the packets that have been received and resequenced from the sequence number in the header information to compensate for the lost packets. Another advantage to using UDP for the delivery of multimedia content is that, UDP being a connectionless protocol, a server may send identical content to multiple recipient clients simultaneously. A disadvantage to UDP is that lost packets may, depending on the information content of such loss packets, result in glitches, stutter or jerkiness of the media content when played back.

The Real-time Transport Protocol (RTP) has been developed for the streaming of multimedia content. RTP takes advantage of UDP and attempt to overcome UDP's disadvantages by adding an extra layer of functionality and rules to server transmitted packets that enhances the delivery of streaming multimedia. Although RTP preferably rides on top of UDP, RTP is designed to ride on top of any other transport layer protocol, and is not inextricably linked to UDP.

RTP utilizes the connectionless packet transmission of UDP/IP and adds a timestamp to the header information of the packets that lets software on the other end reorder packets more efficiently. The timestamp labels a packet with the time it was transmitted, but a single timestamp can also span several packets that are transmitted close together. If some of these packets are lost or received out of order, the timestamp information combined with the sequence numbers in the header facilitate re-sequencing and playback of the media content.

With RTP, when a streaming file is requested, the client media player determines the minimum sustained transfer speed the RTP connection supports and creates a buffer for incoming packets so that the media player can read from the buffer while further packets are still streaming in. For example, the media player may wait until 20% of the requested file you requested is downloaded before it begins playback of the file. While the media player is reading the 20% of the file that has been placed in the buffer, incoming packets are replenishing what is taken. Ideally, an equilibrium is obtain such that the incoming packets replenish the same amount of content as is being read. Otherwise, should the buffer empty completely, the media player may need to pause until the buffer has been replenished. Accordingly, an advantage of RTP over TCP and UDP is that the recipient client can assemble a partial file from the downloaded packets and the client media player can read the file content and produce output from a partially downloaded incoming file while the rest of the packets are still arriving, but still stream those new packets without having to reload the entire file.

A further advantage of RTP is the ability to deliver real-time multimedia content, for example live broadcasts, and transmit such real-time content as an unknown overall quantity of packets and which need not be first saved as a file. A limitation of RTP, however, is that even with a generous buffer in place, RTP may be unable to handle streaming data if, in the event RTP could be enhanced to include a retransmission of packets mechanism similar to TCP/IP, it waited for lost packets to be re-transmitted. The length of time RTP may be required to wait for a lost packet to be transmitted may cause the buffer to be seriously depleted. Depletion of the buffer may in turn require packets to be read as received, or pause the media player until the buffer has been replenished. Furthermore, RTP is disadvantageously slow in determining at the server whether available bandwidth for transmitting packets has been exceeded. Accordingly, if a packet traveling over a RTP connection gets lost, it stays lost, and the media player makes do without it. However, lost packets disadvantageously cause stutter, jitters or pausing in the played back content.

SUMMARY OF THE INVENTION

The present invention overcomes these disadvantages and limitations of RTP by adding reliability to this protocol through the reduction of lost packets and over buffering the data. With the present invention, retransmission of lost packet in RTP is possible without the limitations and disadvantages described above.

According to one embodiment of the present invention, computer system includes a computer network, a client having a buffer, and a server. The client and the server are selectively in communication with each other over the network. The buffer temporarily storing a plurality of RTP packets streamed into the network by the server at a normal streaming rate commensurate with a rate of reading the packets by the client from the buffer. Each of the RTP packets includes at least a sequence number and a timestamp. The client acknowledges to the server each of the packets received by the client, and the server re-transmits to the client any of the packets that remain unacknowledged subsequent to expiration of a predetermined time duration subsequent to the timestamp. The server continuously determines a maximum number of bytes that may be contained in the RTP packets streaming into the network and, in the event a number of bytes in the RTP packets exceeds the maximum number, discontinues streaming of the RTP packets until the number of bytes is less than the maximum number. The server further continuously determines a present streaming rate at which the RTP packets are streamed into the network wherein the present streaming rate exceeds the normal streaming rate.

In accordance with another embodiment of the present invention, a reliable RTP method includes acknowledging to the server each of the packets received by the client, re-transmitting from the server to the client any of the packets that remain unacknowledged subsequent to expiration of a predetermined time duration subsequent to the timestamp, continuously determining a maximum number of bytes that may be contained in the RTP packets streaming into the network and, in the event a number of bytes in the RTP packets exceeds the maximum number, discontinuing streaming of the RTP packets until the determining step indicates the number of bytes is less than the maximum number, and continuously determining a present streaming rate at which the RTP packets are streamed into the network wherein the present streaming rate exceeds the normal streaming rate.

Objects, advantages and features of the present invention will become readily apparent to those skilled in the art from a study of the following Description of the Exemplary Preferred Embodiments when read in conjunction with the attached Drawing and the appended claims.

DESCRIPTION OF THE EXEMPLARY PREFERRED EMBODIMENTS

Figure 1:
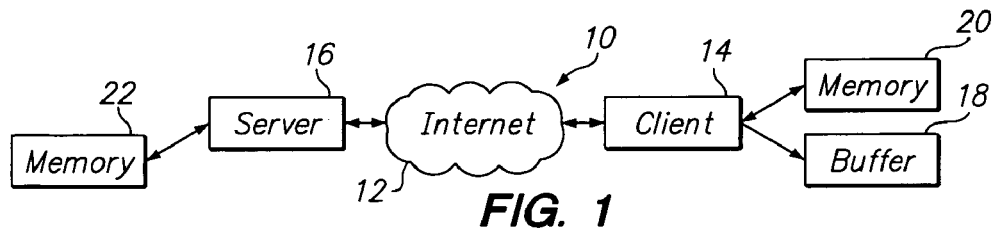
FIG. 1 is a schematic diagram of a communications network constructed according to the principles of one embodiment of the present invention.

Referring now to FIG. 1, there is shown a computer system 10 including a computer network 12, a client 14 and a server 16. The network 12 may preferably be a public computer network, such as the Internet, however, the network 12 may be any local or wide, private or public, computer network.

The client 14 includes a buffer 18 and a computer readable medium 20. The computer readable medium 20 may be any type of electronic storage or memory, such as a hard disk, floppy disk, or dynamic or static random access memory, in which executable programs may be stored and launched for execution, as well as the content utilized by such programs when executed. Similarly, the server 16 also includes a computer readable medium 22 that also may be any type of electronic storage or memory, such as a hard disk, floppy disk, or dynamic or static random access memory, in which executable programs may be stored and launched for execution, as well as the content utilized by such programs when executed. In particular, each computer readable medium 20, 22, alone or in combination with each other, may contain executable program code that when executed implements the herein below described procedures and methods of the present invention.

Figure 2:
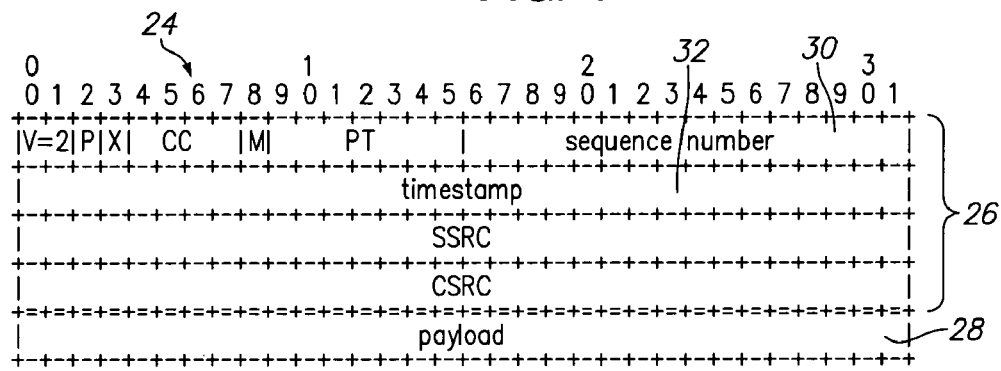
FIG. 2 illustrates an exemplary RTP packet.

As is well known, the client 14 and the server 16 may be selectively in communication with each other over the network 12 during which the server 16 streams plurality of RTP packets into the network 12 that are intended for receipt by the client 14. With further reference to FIG. 2, each of the RTP packets 24 includes a header 26 and a payload 28 following the header 26. The RTP packet header 26 has at least a sequence number 30 and a timestamp 32. The payload 28 contains the data transported by the RTP packet 24, typically samples of compressed multimedia content. The format and interpretation of the payload 28 are well known in the art and need not be further described herein.

The sequence number 30 is a sixteen bit number that increments by one for each RTP packet 24 cents by the server 16. The sequence number 30 is used by the client 14 to detect loss of any RTP packet 24 and restore the sequence of the received RTP packets 24. Typically, the initial value of the sequence number 30 is randomly assigned.

The timestamp 32 is a thirty-two bit number that reflects the sampling instant of the first octet in the RTP packet 24. The sampling instant is derived from a clock that increments monotonically and linearly in time to allow synchronization. The initial value of the timestamp 32 is also random. Several consecutive RTP packet 24 may each have an equal timestamp 32 if they are logically generated at once, for example, belong to the same video frame. Furthermore, consecutive RTP packets 24 may each contain a timestamp 30 that is not monotonic if the data is not transmitted in the order it was sampled, such as in the case of MPEG interpolated video frames. However, the sequence numbers 30 of the RTP packet 24 as transmitted will still be monotonic.

Other details of the header 26 of the RTP packet 24 are well known to the art and need not be further described herein. For example, RFC 1889 describes in detail RTP and RTP packet formation.

Also as is well known, as the client 14 receives the streamed RTP packets 24, software, such as a media player stored in medium 20, executing in the client 14 reassembles the packets in their proper order (albeit with some of the RTP packets 24 having been lost in the network 12) and stores the packets 24 in the buffer 18. The client 14, thus programmed, allows a predetermined time duration of the packets 24 to be stored in the buffer 18 prior to reading such packets 24. Thereafter, the packets 24 are read from the buffer 18 by the client 12 at a nominal reading rate.

The server 16 normally streams the additional packets 24 into the network 12 at a streaming rate commensurate with the rate of reading the packets 24 from the buffer 18, such that the time duration of packets 24 stored in the buffer 18 should not substantially change. As each of the packets 24 is being read and removed from the buffer 18, a new packet 24 should be arriving at the client 12 for storage in buffer 18. However, congestion in the network 12, some of the RTP packets 24 being lost in the network 12, or system interrupts at the client 14 may all affect the time quantity of RTP packets 24 within the buffer 18 at any instant.

Figure 3:
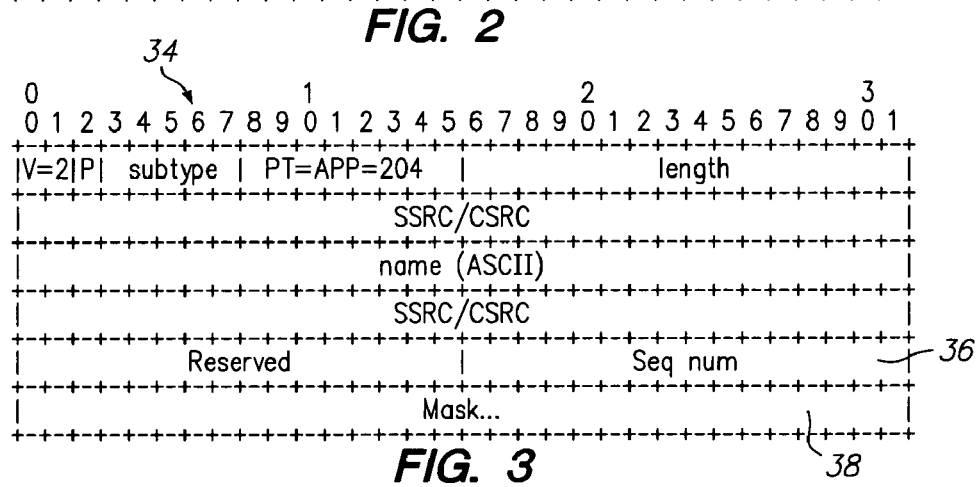
FIG. 3 illustrates an exemplary ACK packet.

According to the present invention, the client 14 acknowledges to the server 16 each of the RTP packets 24 received by the client 14. With further reference to FIG. 3, each of the ACK packets 34 includes a sequence number 36, wherein the sequence number 36 is identical to the sequence number 30 of at least a respective one of the RTP packets 24 received at the client 14. Each of the ACK packets 34 developed by the client 14 is transmitted to the server 16. Accordingly, in one embodiment of the present invention, one ACK packet 34 may be developed for each received RTP packet 24. In this embodiment, as the server 16 receives each ACK packet 34 it can determine from the sequence number 36 therein the receipt by the client 14 of the corresponding RTP packet 24 having the identical sequence number 30.

In another embodiment of the present invention, each of the ACK packets 34 may further include a bit mask 38 enabling a single ACK packet 34 to acknowledge multiple RTP packets 24. In this embodiment, the sequence number 36 identifies the first RTP packet 24 being acknowledged by the client 14, and each additional RTP packet 24 being acknowledged is represented by a bit set in the bit mask 38. The bit mask 38 thus represents an offset from the sequence number 36. For example, the high order bit of the first byte in the bit mask 38 may represent an offset one greater than the sequence number 36, the second bit of the first byte may then represent an offset two greater than the sequence number 36, and so forth. Preferably, the bit mask 38 is sent in multiples of four octets. Furthermore, a bit set to zero does not imply a negative acknowledgment of a sequence number 30 identified by such bit position, but means that the client 14 does not wish to acknowledge this particular sequence number 30 represented by this particular bit in this ACK packet 34.

In either embodiment, the ACK packet 34 may preferably be a type of RTCP APP packet, as described in the aforementioned RFC 1889. The sequence number 36 and bit mask 38 of the ACK packet 34 represent the payload portion of the RTCP APP packet following the RTCP APP packet header. Accordingly, when using the RTCP APP packet to develop the ACK packet 34, the details for the header for such packet are well known and need not be further described herein.

Another feature of the present invention is the retransmission of lost RTP packets 24. The server 16 retransmits to the client 14 any of the packets 24 that remain unacknowledged subsequent to expiration of a predetermined time duration initiated substantially concurrent to the timestamp 28. More particularly, the server 16 computes the predetermined time duration as an estimated round-trip time.

To compute the estimated round-trip time, the server 16 measures a time period from transmission of each one of the RTP packets 24 streamed by the server 16 to receipt by the server 16 of the ACK packets 34 acknowledging each respective one of the RTP packets 24. More particularly, to measure the time period the server 16 marks each of a time of transmission for each one of the RTP packets 24 streamed from the server 16 and a time of receipt for the ACK packets 34 acknowledging each respective one of the RTP packets 24. The server 16 then calculates as a function of the time of transmission and the time of receipt the estimated round-trip time. In a preferred embodiment of the present invention, the function used may be Karn's algorithm.

In certain other embodiments of the present invention, the server 16 may ignore the time period for any one of the RTP packets 24 having been retransmitted prior to receipt of by the server 16 of one of the ACK packets 34 acknowledging this particular one of the RTP packets 24. The server 16 may also initialize a minimum round-trip threshold, and may then further reset the minimum round-trip threshold to the estimated round-trip time in the event the estimated round-trip time is less than the minimum round-rip threshold. The server 16 may also initialize a maximum round-trip threshold, and may then further reset the maximum round-trip threshold to the estimated round-trip time in the event the estimated round-trip time is greater than the maximum round-trip threshold. The server 16 may also initialize the maximum round-trip threshold equal to the initial minimum round-trip threshold.

The server 16 may also increase the estimated round-trip time upon an occurrence of the server 16 retransmitting the any of the RTP packets 24. In such event, the estimated round-trip time may be increased by a predetermined coefficient. For example, the predetermined coefficient may be equal to 3/2.

Another feature of the present invention minimizes the occurrence of lost ones of the RTP packets 24 due to congestion in the network 12. Accordingly, the server 16 may continuously determine a maximum number of bytes that may be contained in the RTP packets 24 streaming into the network 12 and, in the event a number of bytes in the RTP packets 24 exceeds the maximum number, the server 16 discontinues streaming of the RTP packets 24 until the number of bytes is less than the maximum number.

To determine the maximum number of bytes, the server 16 computes a congestion window size and further computes a difference between a number of bytes in the RTP packets 24 currently streamed into the network and a number of bytes in the RTP packets 24 acknowledged by the ACK packets 34. The maximum number of bytes is then a number of bytes by which the congestion window size exceeds the difference.

In one embodiment of the present invention, the server 16 may set the congestion window size to an initial congestion window size and then further vary the congestion window size in response to receiving the ACK packets 34. The congestion window size may also be constrained by a maximum congestion window size. The initial congestion window size may further be a selected multiple of a maximum segment size, wherein the maximum segment size is the total number of bytes in the RTP packets that may be acknowledged by a single one of the ACK packets 34. For example, the selected multiple may be four.

The server 16 may also vary the congestion window size as a function of a number of bytes in each of the RTP packets for which a respective one of the ACK packets has been received. This function depends on whether the present congestion window size is above or below a slow start threshold. The slow start threshold and the slow start algorithm is described in commonly owned, copending application Ser. No. 09/680,990, filed Oct. 6, 2000.

If the present congestion window is presently below the slow start threshold, the function increases the congestion window size by a number of bytes in each one of the RTP packets 24 for which a respective one of the ACK packets 34 has been received. Alternatively, if the present congestion window is presently above the slow start threshold, the new congestion window size is increased by a value equal to the square of the maximum segment size divided by a present size of the congestion window size for each one of the ACK packets 34 received acknowledging the maximum segment size.

Upon an occurrence of the server 16 retransmitting any one of the RTP packets, the server 16 may further reset the congestion window size to a lesser of one-half of the slow start threshold and one-half of the current congestion window size. Furthermore, the maximum congestion window size may be set equal to a size of a client window advertised by the client 14 (as described below), and the slow start threshold initialized to a value of one-half the client window.

Each of the RTP packets 24 streamed into the network 12 may further be associated with an expiration time. As described above, unacknowledged ones of the RTP packets 24 are retransmitted upon expiration of a predetermined time duration. However, in the event the expiration time is less than the predetermined time duration, these RTP packets 24 remaining unacknowledged are not retransmitted.

The number of bytes of the any of the RTP packets 24 remaining unacknowledged after expiration of the time duration may also be added to the present size of the congestion window. Although it is contemplated by the present invention, it is preferred that the number of bytes in the RTP packets 24 for which the associated expiration time has passed are not added to the present size of the congestion window.

Figure 4:
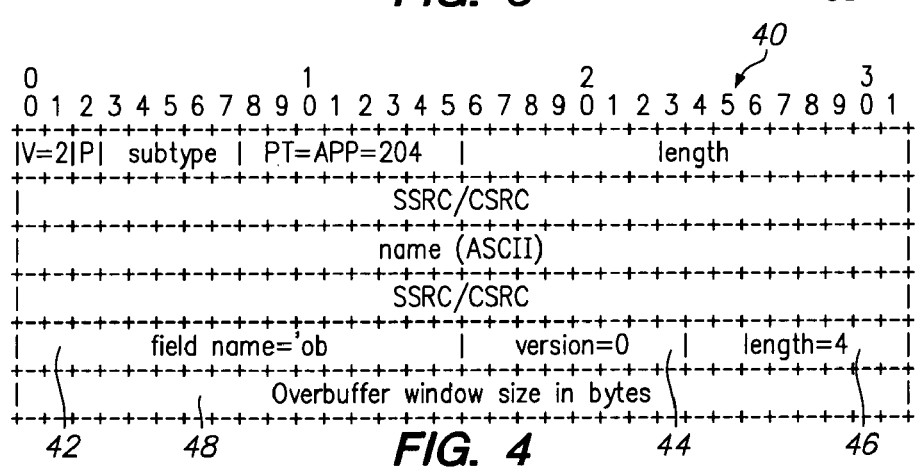
FIG. 4 illustrates an exemplary APP packet.

Another feature of the present invention is overbuffering of the RTP packets 24. The server 16 continuously determines a present streaming rate at which the RTP packets 24 are streamed into the network 12 wherein the present streaming rate may exceed the normal streaming rate. The client 14 reports to the server 16 an overbuffer window size and the server 16 in response thereto sets the streaming rate at a rate above the rate of reading wherein a number of the RTP packets 24 in the overbuffer window size is transmitted. To report the overbuffer window size, the client 14 develops an RTCP APP packet 40, as best seen in FIG. 4, and further sends the RTCP APP packet 40 to the server 16. The server 16 may also discontinue streaming of the RTP packets 24 when the overbuffer window is full.

The RTCP APP packet 40 may include a two octet field name 42, a one octet field version 44 and a one octet field length 46. The payload of the RTCP APP packet 40 also conveys the overbuffer window size in bytes, as indicated at 48. As described above, the header information of the RTCP APP packet 40 is well known and need not be further described herein.

Whether the enhancements to RTP in the system 10 as described above are used may be negotiated out of band in the Real-time Streaming Protocol (RTSP), as described in RFC 2326. RTSP is initiated by the client 14 by sending to the server 16 a setup request. The setup request includes a first header appended thereto. The body of the first header may then include the protocol name for the enhanced RTP protocol described above. The first header may further include an argument. In the present invention, this argument is the client window size used above in determination of the congestion window.

The setup request may also include a second header, which is a transport option header. One such option may be a late tolerance. For example, an unacknowledged RTP packet 24, although neither expired nor having the time duration for retransmission expired, may nonetheless not be re-transmitted because the software executing in the client 14 has already read packets from the buffer 18, thereby ignoring this packet. In other words, the late tolerance option tells the server 16 that it is too late to retransmit the unacknowledged RTP packet 24.

The server 16, in response to the setup request, generates a setup response, which is sent to the client 14. The setup response must also contain the same header information as used in the setup request.

Figure 5:
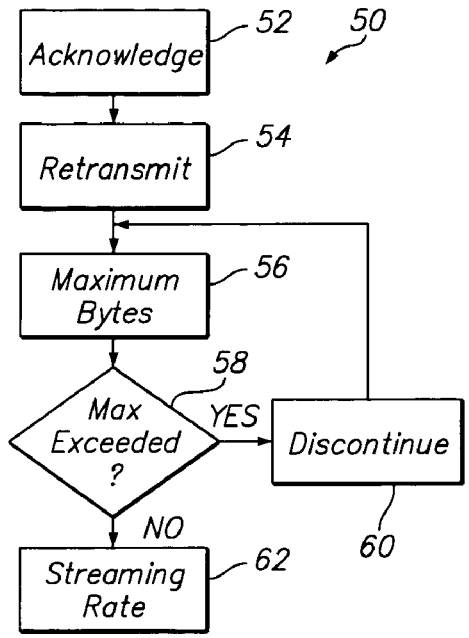
FIG. 5 is a flowchart useful to describe another embodiment of the present invention.

Referring now to FIG. 5, there is shown a flowchart 50 useful to describe a method in another aspect of the present invention. The method includes the step 52 of acknowledging to the server 16 each of the RTP packets 24 received by the client 14, the step 54 of retransmitting from the server 16 to the client 14 any of the RTP packets 24 that remain unacknowledged subsequent to expiration of a predetermined time duration subsequent to the timestamp 32, the step 56 of continuously determining a maximum number of bytes that may be contained in the RTP packets 24 streaming into the network 12, and, in the event a number of bytes in the RTP packets 24 exceeds the maximum number, as indicated at the decision step 58, the step 60 of discontinuing streaming of the RTP packets 24 until the determining step 56 indicates the number of bytes is less than the maximum number, and the step 62 of continuously determining a present streaming rate at which the RTP packets are streamed into the network wherein the present streaming rate exceeds the normal streaming rate.

Figure 6:
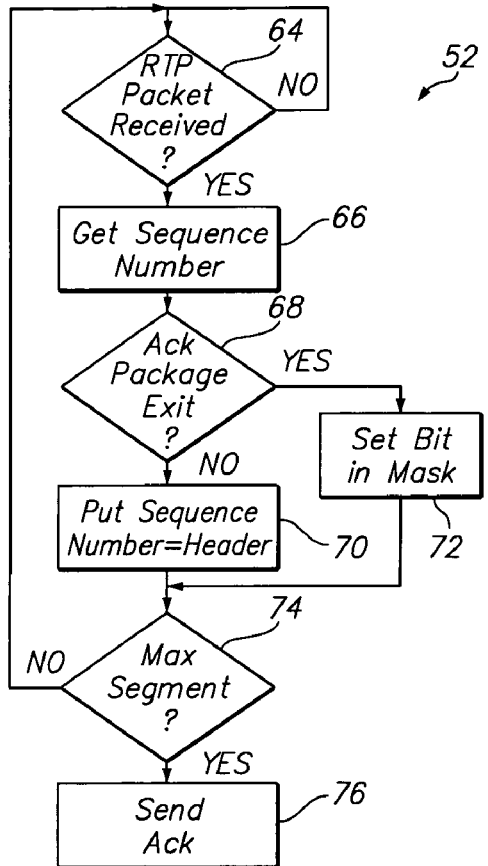
FIG. 6 is a flowchart useful to describe the acknowledging step of FIG. 5.

Referring now to FIG. 6, there is shown an exemplary embodiment of the acknowledging step 52 (FIG. 5). As indicated at 64, the client 14 repeatedly monitors the connection with the server 16 to decide whether one of the RTP packets 24 has been received. If no, the decision loops back upon itself. If yes, the sequence number 30 from the header 26 of the received RTP packets 24 is obtained, as indicated at 66.

As indicated at 68, a decision is made to whether the client 14 has already started to construct an ACK packet 34. If no, a new ACK packet 34 is started and the sequence number 30 from the received RTP packet 24 is inserted into the new ACK packet 34, as indicated at 70. If yes, a bit is set in the bit mask 38 and inserted into the bit mask 38 of the existing ACK packet 34, as indicated at 72.

In either event, a decision is made, as indicated at 74, whether the maximum segment size to be acknowledged in the ACK packet 34 has been reached. If no, a path is taken back to step 64 were at the client 14 continually monitors the receipt of new RTP packets 24. If yes, the ACK packet 34 is sent to the client 16 as indicated at step 76.

Figure 7:
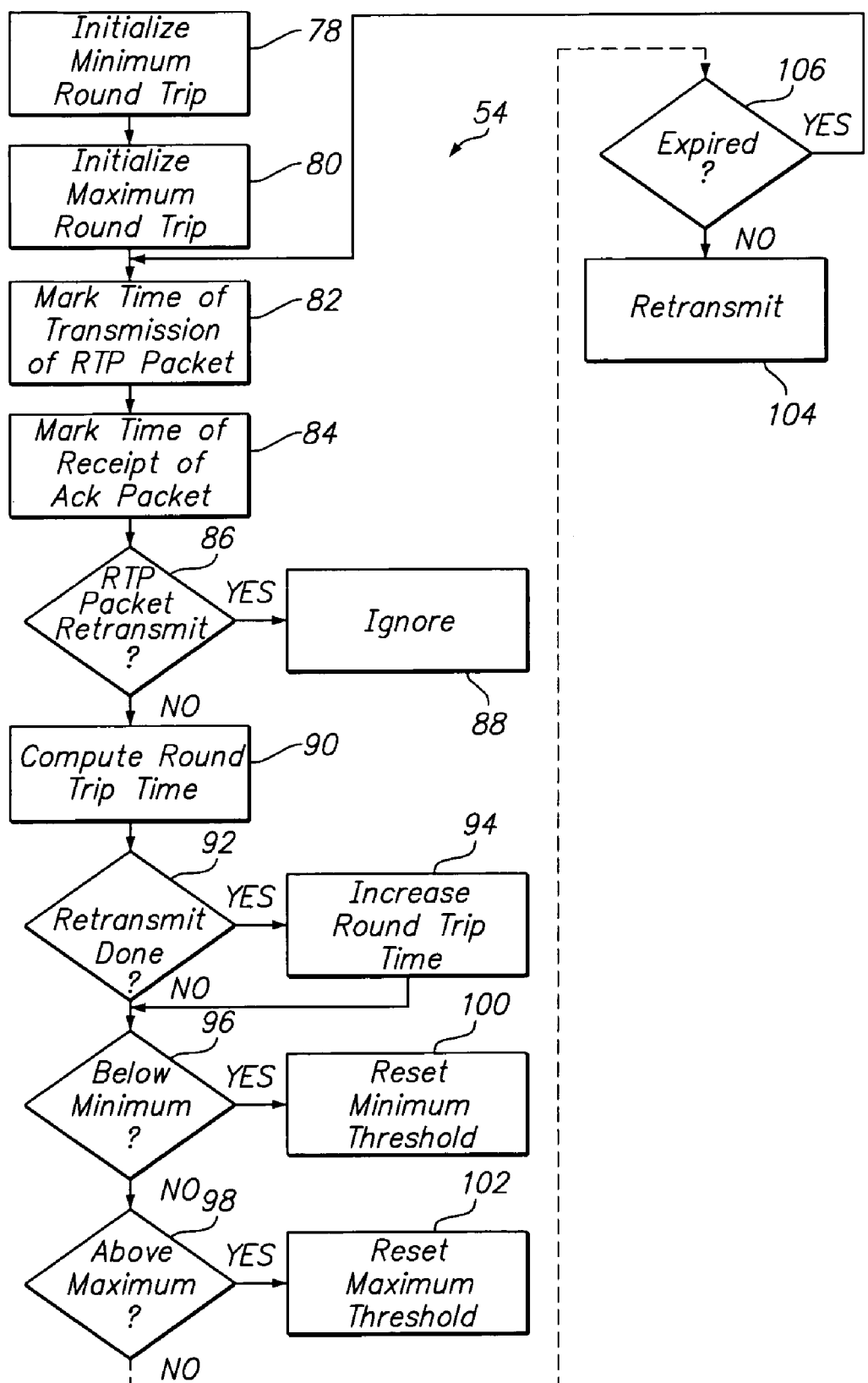
FIG. 7 is a flowchart useful to describe the retransmitting step of FIG. 5.

Referring now to FIG. 7, there is shown an exemplary embodiment of the retransmitting step 54 (FIG. 5). A minimum round-trip time and a maximum round-trip time thresholds are initialized, as respectively indicated at steps 78 and 80. The maximum round-trip time threshold may further be initialized to be equal to the minimum round-trip time threshold. Upon sending the RTP packets 24, the servers 16 marks the time of transmission of each of the RTP packets, as indicated at step 82. As each one of the ACK packets 34 is received, the servers 16 also marks the time of receipt thereof, as indicated at 84. Since each of the ACK packets 34 contains the sequence number 36 and the bit mask 38 identifying the transmitted RTP packets 24, a round-trip time estimated may be calculated.

However, as indicated at 86, a decision is made whether one of the RTP packets 24 having been acknowledged has been retransmitted prior to receipt of the ACK packet 34 acknowledging such RTP packet 24. If yes, the round-trip time from sending such RTP packet 24 to receiving the acknowledging ACK packet 34 is ignored, as indicated at step 88. Otherwise, if no, the estimated round-trip time it is computed, as indicated at step 90, preferably using Karn's algorithm.

After the estimated round-trip time is computed at step 90, a decision is made, at step 92, whether a retransmit of an RTP packet 24 has occurred. If yes, the estimated round-trip time is increased, as indicated at step 94. The increasing at step 94 may include multiplying the current estimated round-trip time by a coefficient. For example, such coefficient may be ⅔.

Irrespective of the decision at step 92, a pair of further decisions are made to determine whether the present estimated round-trip time is below the initial minimum round-trip time threshold or above the initial maximum round-trip time threshold, as determined at steps 96 and 98, respectively. If yes, the minimum round-trip threshold is reset to the estimated round-trip time in the event the estimated round-trip time is less than the initial minimum threshold, as indicated at step 100, and the maximum round-trip threshold is reset to the estimated round-trip time in the event the estimated round-trip time is greater than the initial maximum threshold, as indicated at step 102.

Retransmission of one of the RTP packets 24 occurs when the corresponding ACK packet 34 has not been received within the estimated round trip time, as indicated at step 104. Prior to retransmission, a decision is made, as indicated at 106 whether the packet has expired. If yes, the packet is not retransmitted, otherwise step 104 is performed.

Figure 8:
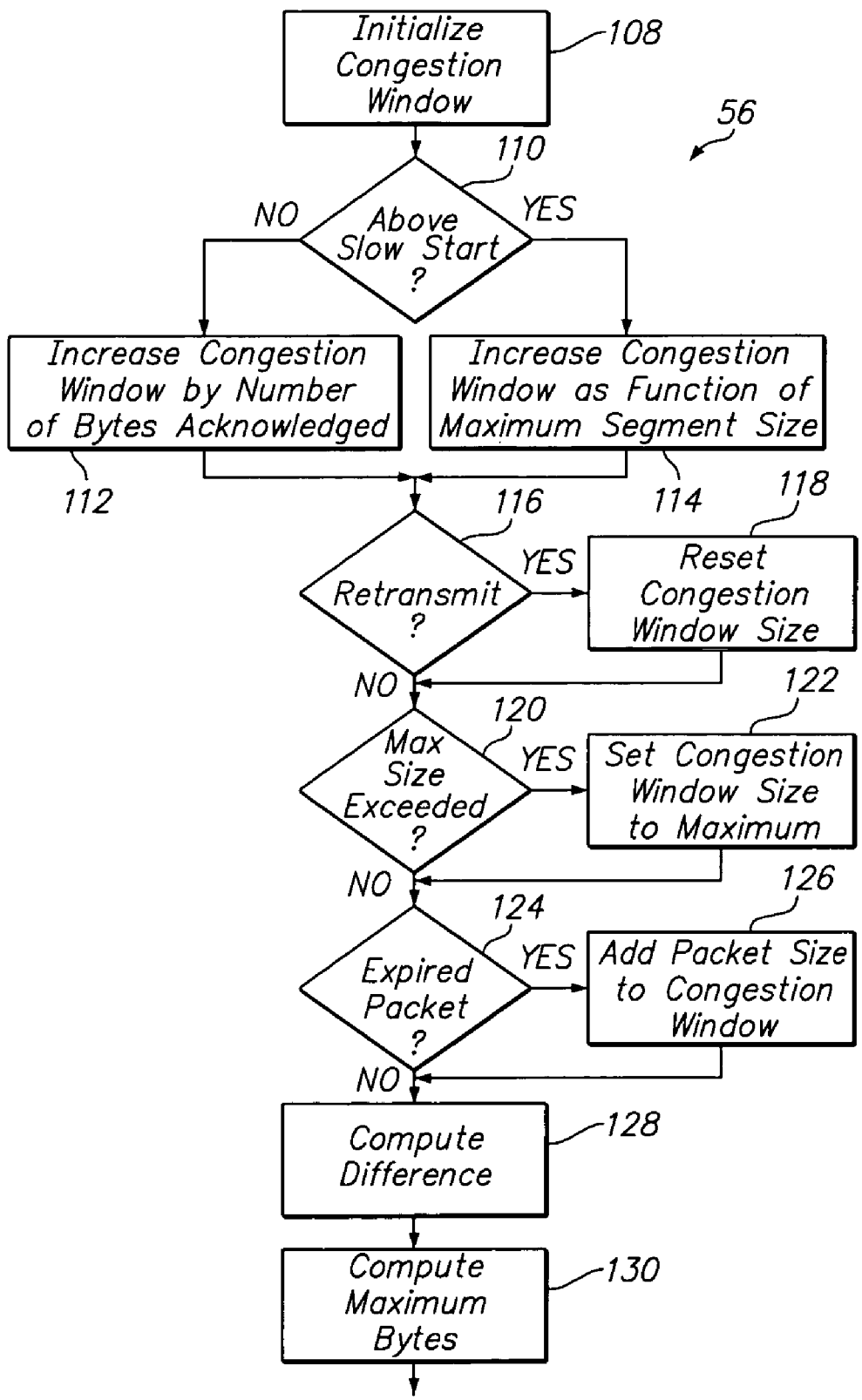
FIG. 8 is a flowchart useful to describe the maximum number of bytes computing step of FIG. 5.

Referring now to FIG. 8, there is shown an exemplary embodiment of the computing the maximum number of bytes step 56 (FIG. 5). At step 108, the congestion window size is initialized. Preferably, the initial congestion window size is set as a multiple of the maximum segment size. For example, the initial congestion window size may be set to four times the maximum segment size. Once the congestion window size is initialized, a decision is made at step 110 to determine if the congestion window size is above the slow start threshold. If no, the congestion window size is increased by the number of bytes in knowledge in each of the received ACK packets 34, as indicated at step 112. If yes, the congestion window size is increased by the square of the maximum segments size divided by the current congestion window size, as indicated at step 114.

In further computing the size of the congestion window, a decision is made at step 116 to determine whether retransmit of one of the RTP packets has occurred. If yes, the congestion window size is reset, as indicated at step 118 to a lesser of one-half of a slow start threshold and one-half of a current congestion window size upon an occurrence of the retransmitting step 54 (FIG. 5).

Irrespective of whether a retransmit has occurred, a decision is made at step 120 to determine whether the congestion window size exceeds the maximum congestion window size. If yes, at step 122 the congestion window size is set to the size of the client window, this being the maximum congestion window size.

Irrespective of whether the congestion window size exceeds the maximum size, a decision is made at step 124 to determine if the size of the congestion window includes an expired one of the RTP packets 24. If yes, the size of the expired RTP packet 24 is added to the congestion window size, as indicated at step 126.

Irrespective of the decision made at step 124, a difference between a number of bytes in the RTP packets 24 currently streamed into the network and a number of bytes in the RTP packets acknowledged by the ACK packets 34 is computed, as indicated at step 128. At step 130, the maximum number of bytes is computed as being a number of bytes by which the congestion window size exceeds the difference computed at step 128.

Figure 9:
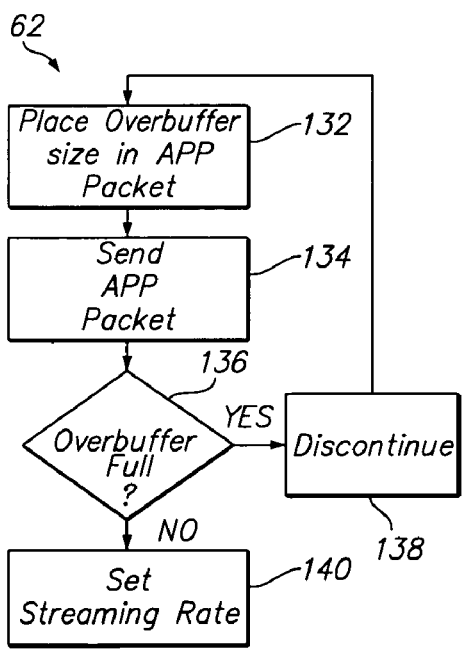
FIG. 9 is a flowchart useful to describe the streaming rate computing step of FIG. 5.

Referring now to FIG. 9, there is shown an exemplary embodiment of the streaming rate determining step 62 (FIG. 5). As indicated at step 132, the client 12 places the overbuffer window size 48 in the APP packet 40 (FIG. 4), and sends the APP packet 40 to the client 16, as indicated that step 134.

A decision is made at step 136 to determine whether the overbuffer window is full. If yes, streaming of the RTP packets 24 is discontinued, as indicated at step 138. Otherwise, the server 16 sets a streaming rate at a rate above the rate of reading from the client buffer 18 (FIG. 1), as indicated at step 140.

Figure 10:
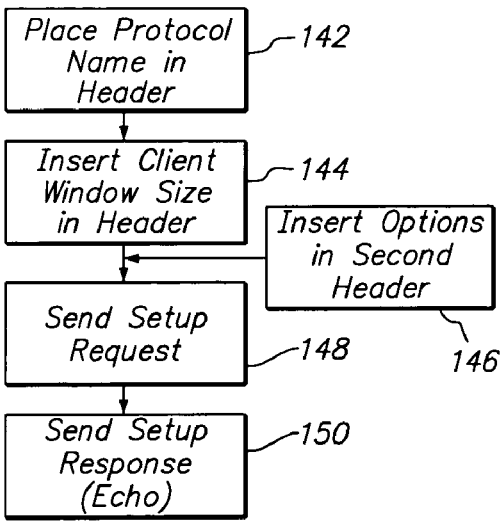
FIG. 10 is a flowchart useful to describe a protocol setup.

With reference to FIG. 10, there is shown a flowchart useful to describe the setup of the reliable RTP method described in conjunction with FIG. 5. At step 142, the protocol name of the above described protocol method is inserted into the header of the setup request, and the client window size is also inserted into the header, as indicated at step 144. Optionally, as indicated at step 146, options, such as a late tolerance option to as described above, may be inserted into a second header.

Once the setup request has been completed, the client 12 cents the setup request to the server 16 as indicated at step 148. In response thereto, they server 16 cents a setup response, as indicated at step 150, wherein the response that those to setup request.

There has been described hereinabove novel apparatus and methods for reliable RTP. Those skilled in the art may now make numerous uses of and departures from the above described exemplary preferred embodiments without departing from the inventive principles disclosed herein. Accordingly, the present invention is to be defined solely by the permissible scope of the appended claims.

What is claimed is:

1. In a computer network having at least one client and at least one server, said client and said server being selectively in communication with each other over said network, said server streaming into said network a plurality of Real-time Transport Protocol, RTP, packets addressed for said client at a normal streaming rate commensurate with a rate of reading said packets at said client, each of said RTP packets including at least a sequence number and a timestamp, a reliable RTP method comprising:
   acknowledging to said server each of said RTP packets received by said client;
   re-transmitting from said server to said client any of said RTP packets that remain unacknowledged subsequent to expiration of a predetermined time duration subsequent to said timestamp;
   continuously determining a maximum number of bytes that may be contained in said RTP packets streaming into said network and, in the event a number of bytes in said RTP packets exceeds said maximum number, discontinuing streaming of said RTP packets until said determining step indicates said number of bytes is less than said maximum number; and
   continuously determining a present streaming rate at which said RTP packets are streamed into said network wherein said present streaming rate exceeds said normal streaming rate.

2. A method as set forth in claim 1 wherein said acknowledging includes sending from said client to said server of plurality of ACK packets in response to receiving said RTP packets.

3. A method as set forth in claim 2 wherein said sending step includes inserting into each of said ACK packets said sequence number of at least a respective one of said RTP packets received at said client.

4. A method as set forth in claim 3 wherein said inserting step further includes inserting a bit mask representing an offset from said sequence number into each of ACK packets.

5. A method as set forth in claim 2 further comprising:
   computing said predetermined time duration as an estimated round-trip time.

6. A method as set forth in claim 5 wherein said computing step includes:
   measuring a time period from transmission of each one of said RTP packets streamed by said server to receipt by said server of said ACK packets acknowledging each respective one of said RTP packets.

7. A method as sct forth in claim 6 wherein said measuring step includes:
   marking a time of transmission for each one of said RTP packets streamed from said server;
   marking a time of receipt for said ACK packets acknowledging each respective one of said RTP packets;
   calculating as a function of said time of transmission and said time of receipt said estimated round-trip time.

8. A method as set forth in claim 7 wherein said calculating step utilizes Karn's algorithm.

9. A method as set forth in claim 6 wherein said computing step includes ignoring said time period for any one of said RTP packets having been re-transmitted prior to receipt of by said server of one of said ACK packets acknowledging said any one of said RTP packets.

10. A method as set forth in claim 5 further comprising:
    initializing a minimum round-trip threshold.

11. A method as set forth in claim 10 further comprising:
    resetting said minimum round-trip threshold to said estimated round-trip time in the event said estimated round-trip time is less than said minimum round-trip threshold.

12. A method as set forth in claim 5 further comprising:
    initializing a maximum round-trip threshold.

13. A method as set forth in claim 12 further comprising:
    resetting said maximum round-trip threshold to said estimated round-trip time in the event said estimated round-trip time is greater than said maximum round-trip threshold.

14. A method as set forth in claim 12 wherein said initializing step includes initializing said maximum round-trip threshold equal to an initial minimum round-trip threshold.

15. A method as set forth in claim 5 further comprising increasing said estimated round-trip time upon an occurrence of said re-transmitting step.

16. A method as set forth in claim 15 wherein said increasing step includes multiplying said estimated round-trip time by a predetermined coefficient.

17. A method as set forth in claim 16 wherein said predetermined coefficient is equal to $3/2$.

18. A method as set forth in claim 2 wherein said maximum number of bytes determining step includes:
    computing a congestion window size; and
    computing a difference between a number of bytes in said RTP packets currently streamed into said network and a number of bytes in said RTP packets acknowledged by said ACK packets, said maximum number of bytes being a number of bytes by which said congestion window size exceeds said difference.

19. A method as set forth in claim 18 wherein said congestion window size computing step includes:
setting said congestion window size to an initial congestion window size;
varying said congestion window size constrained by a maximum congestion window size in response to receiving said ACK packets.

20. A method as set forth in claim 19 wherein said setting step includes computing said initial congestion window size as a selected multiple of a maximum segment size.

21. A method as set forth in claim 20 wherein said selected multiple of said maximum segment size is four.

22. A method as set forth in claim 19 wherein said varying step includes functionally computing said congestion window size as a function of a selected one of a maximum segment size and a number of bytes in each of said RTP packets for which a respective one of said ACK packets has been received.

23. A method as set forth in claim 22 wherein said functionally computing step includes increasing said congestion window size by a number of bytes in each one of said RTP packets for which a respective one of said ACK packets has been received.

24. A method as set forth in claim 23 wherein said increasing step is performed only in the event of said congestion window size is presently below a slow start threshold.

25. A method as set forth in claim 22 wherein said functionally computing step includes increasing said congestion window size for each full window of said ACK packets received.

26. A method as set forth in claim 25 wherein said increasing step is performed only in the event said congestion window size is presently above a slow start threshold.

27. A method as set forth in claim 19 wherein said congestion window size computing step further includes resetting said congestion window size to a lesser of one-half of a slow start threshold and one-half of a current congestion window size upon an occurrence of said retransmitting step.

28. A method as set forth in claim 19 wherein said varying step includes setting said maximum congestion window size equal to a size of a client window.

29. A method as set forth in claim 1 wherein said re-transmitting step includes inserting into each of said RTP packets an expiration time, said any of said packets remaining unacknowledged not being re-transmitted in the event said expiration time is less than said predetermined time duration.

30. A method as set forth in claim 1 wherein said maximum number of bytes determining step includes adding to said maximum number a number of bytes of said any of said RTP packets remaining unacknowledged after expiration of said time duration.

31. A method as set forth in claim 1 wherein said streaming rate determining step includes:
reporting by said client to said server an overbuffer window size; and
setting said streaming rate at a rate above said rate of reading wherein said overbuffer window size is transmitted.

32. A method as set forth in claim 31 wherein said reporting step includes:
inserting into an APP packet said overbuffer window size; and
sending by said client to said server said APP packet.

33. A method as set forth in claim 31 wherein said streaming rate determining step further includes discontinuing streaming of said RTP packets when said overbuffer window is full.

34. A method as set forth in claim 1 further comprising:
inserting into a setup request first header information communicated to said server by said client to initiate said reliable RTP method; and
inserting said first header information identically into a setup response to be communicated to said client by said server.

35. A method as set forth in claim 34 wherein said first header information includes a protocol name and at least one parameter following said protocol name.

36. A method as set forth in claim 35 wherein said parameter includes a client window size.

37. A method asset forth in claim 34 further comprising:
inserting into said setup request second header information indicative of transport options, said second header information being inserted identically into said setup response.

38. A method as set forth in claim 37 wherein one of said options is a late tolerance option.

39. A computer system comprising:
a computer network;
a client including a buffer; and
a server, said client and said server being selectively in communication with each other over said network, said buffer temporarily storing a plurality of Real-time Transport Protocol, RTP, packets streamed into said network by said server at a normal streaming rate commensurate with a rate of reading said packets by said client from said buffer, each of said RTP packets including at least a sequence number and a timestamp, said client acknowledging to said server each of said RTP packets received by said client, said server re-transmitting to said client any of said RTP packets that remain unacknowledged subsequent to expiration of a predetermined time duration subsequent to said timestamp, said server continuously determining a maximum number of bytes that may be contained in said RTP packets streaming into said network and, in the event a number of bytes in said RTP packets exceeds said maximum number, discontinuing streaming of said RTP packets until said number of bytes is less than said maximum number, and said server further continuously determining a present streaming rate at which said RTP packets are streamed into said network wherein said present streaming rate exceeds said normal streaming rate.

40. A system as set forth in claim 39 wherein said client develops a plurality of ACK packets in response to receiving said RTP packets, each of said ACK packet being sent from said client to said server to acknowledge receipt of said RTP packets.

41. A system as set forth in claim 40 wherein each of said ACK packets includes said sequence number of at least a respective one of said RTP packets received at said client.

42. A system as set forth in claim 41 wherein each of said ACK packets further includes a bit mask representing an offset from said sequence number.

43. A system as set forth in claim 42 wherein said server further computes said predetermined time duration as an estimated round-trip time.

44. A system as set forth in claim 43 wherein said server to compute said predetermined time duration further measures a time period from transmission of each one of said RTP packets streamed by said server to receipt by said server of said ACK packets acknowledging each respective one of said RTP packets.

45. A system as set forth in claim 44 wherein said server to measure said time period marks each of a time of transmission for each one of said RTP packets streamed from said server and a time of receipt for said ACK packets acknowledging each respective one of said RTP packets, and further wherein said server further calculates as a function of said time of transmission and said time of receipt said estimated round-trip time.

46. A system as set forth in claim 45 wherein said function is Karn's algorithm.

47. A system as set forth in claim 44 wherein said server ignores said time period for any one of said RTP packets having been re-transmitted prior to receipt of by said server of one of said ACK packets acknowledging said any one of said RTP packets.

48. A system as set forth in claim 43 wherein said server further initializes a minimum round-trip threshold.

49. A system as set forth in claim 48 wherein said server further resets said minimum round-trip threshold to said estimated round-trip time in the event said estimated round-trip time is less than said minimum round-trip threshold.

50. A system as set forth in claim 43 wherein said server further initializes a maximum round-trip threshold.

51. A system as set forth in claim 50 wherein said server further resets said maximum round-trip threshold to said estimated round-trip time in the event said estimated round-trip time is greater than said maximum round-trip threshold.

52. A system as set forth in claim 50 wherein said server initializes said maximum round-trip threshold equal to an initial minimum round-trip threshold.

53. A system as set forth in claim 43 wherein said server increases said estimated round-trip time upon an occurrence of said server re-transmitting said any of said RTP packets.

54. A system as set forth in claim 53 wherein said estimated round-trip time is increased by a predetermined coefficient.

55. A system as set forth in claim 54 wherein said predetermined coefficient is equal to $3/2$.

56. A system as set forth in claim 40 wherein said server to determine said maximum number of bytes computes a congestion window size and further computes a difference between a number of bytes in said RTP packets currently streamed into said network and a number of bytes in said RTP packets acknowledged by said ACK packets, said maximum number of bytes being a number of bytes by which said congestion window size exceeds said difference.

57. A system as set forth in claim 56 wherein said server to compute said congestion window size sets said congestion window size to an initial congestion window size and further varies said congestion window size in response to receiving said ACK packets, said congestion window size being constrained by a maximum congestion window size.

58. A system as set forth in claim 57 wherein said initial congestion window size is a selected multiple of a maximum segment size.

59. A system as set forth in claim 58 wherein said selected multiple is four.

60. A system as set forth in claim 57 wherein said server to vary said congestion window size computes said congestion window size as a function of a selected one of a maximum segment size and a number of bytes in each of said RTP packets for which a respective one of said ACK packets has been received.

61. A system as set forth in claim 60 wherein said function increases said congestion window size by a number of bytes in each one of said RTP packets for which a respective one of said ACK packets has been received.

62. A system as set forth in claim 61 wherein said congestion window size is presently below a slow start threshold.

63. A system as set forth in claim 60 wherein said function increases said congestion window size as a function of a square of said maximum segment size divided by a present size of said congestion window size for each one of said ACK packets received acknowledging said maximum segment size.

64. A system as set forth in claim 63 wherein said congestion window size is presently above a slow start threshold.

65. A system as set forth in claim 57 wherein said server resets said congestion window size to a lesser of one-half of a slow start threshold and one-half of a current congestion window size upon an occurrence of said server re-transmitting said any one of said RTP packets.

66. A system as set forth in claim 57 wherein said maximum congestion window size is set equal to a size of a client window.

67. A system as set forth in claim 39 wherein each of said RTP packets is associated with an expiration time, said any of said RTP packets remaining unacknowledged not being re-transmitted in the event said expiration time is less than said predetermined time duration.

68. A system as set forth in claim 39 wherein said maximum number of bytes includes a number of bytes of said any of said RTP packets remaining unacknowledged after expiration of said time duration.

69. A system as set forth in claim 39 wherein said client report to said server an overbuffer window size and said server in response thereto sets said streaming rate at a rate above said rate of reading wherein said overbuffer window size is transmitted.

70. A system as set forth in claim 69 wherein said client develops an APP packet to report said overbuffer window size and further sends said APP packet to said server.

71. A system as set forth in claim 69 wherein said server further discontinues streaming of said RTP packets when said overbuffer window is full.

72. A system as set forth in claim 39 wherein said client to initiate communication over said network transmits a setup request to said server, said setup request including first header information, and said server in response thereto transmits a setup response to said client, said setup response including said first header information.

73. A system as set forth in claim 72 wherein said first header information includes a protocol name and at least one parameter following said protocol name.

74. A system as set forth in claim 73 wherein said parameter includes a client window size.

75. A system as set forth in claim 72 wherein said setup request further includes second header information indicative of transport options, said second header information being inserted identically into said setup response.

76. A system as set forth in claim 75 wherein one of said options is a late tolerance option.

77. In a computer network having at least one client and at least one server, said client and said server being selectively in communication with each other over said network, said server streaming into said network a plurality of Real-time Transport Protocol, RTP, packets addressed for said client at a normal streaming rate commensurate with a rate of reading said packets at said client, each of said RTP packets including at least a sequence number and a timestamp, a computer readable medium containing programming code that when executed implements procedures comprising:

acknowledging to said server each of said RTP packets received by said client;

re-transmitting from said server to said client any of said RTP packets that remain unacknowledged subsequent to expiration of a predetermined time duration subsequent to said timestamp;

continuously determining a maximum number of bytes that may be contained in said RTP packets streaming into said network and, in the event a number of bytes in said RTP packets exceeds said maximum number, discontinuing streaming of said RTP packets until said determining procedure indicates said number of bytes is less than said maximum number; and continuously determining a present streaming rate at which said RTP packets are streamed into said network wherein said present streaming rate exceeds said normal streaming rate.

78. A medium as set forth in claim 77 wherein said acknowledging procedure includes sending from said client to said server of plurality of ACK packets in response to receiving said RTP packets.

79. A medium as set forth in claim 78 wherein said sending procedure includes inserting into each of said ACK packets said sequence number of at least a respective one of said RTP packets received at said client.

80. A medium as set forth in claim 79 wherein said inserting procedure further includes inserting a bit mask representing an offset from said sequence number into each of ACK packets.

81. A medium as set forth in claim 78 further comprising: computing said predetermined time duration as an estimated round-trip time.

82. A medium as set forth in claim 81 wherein said computing procedure includes procedures of:

measuring a time period from transmission of each one of said RTP packets streamed by said server to receipt by said server of said ACK packets acknowledging each respective one of said RTP packets.

83. A medium as set forth in claim 82 wherein said measuring procedure includes procedures of:

marking a time of transmission for each one of said RTP packets streamed from said server;

marking a time of receipt for said ACK packets acknowledging each respective one of said RTP packets;

calculating as a function of said time of transmission and said time of receipt said estimated round-trip time.

84. A medium as set forth in claim 83 wherein said calculating procedure utilizes Karn's algorithm.

85. A medium as set forth in claim 82 wherein said computing procedure includes ignoring said time period for any one of said RTP packets having been re-transmitted prior to receipt of by said server of one of said ACK packets acknowledging said any one of said RTP packets.

86. A medium as set forth in claim 81 further comprising procedures of:

initializing a minimum round-trip threshold.

87. A medium as set forth in claim 86 further comprising procedures of:

resetting said minimum round-trip threshold to said estimated round-trip time in the event said estimated round-trip time is less than said minimum round-trip threshold.

88. A medium as set forth in claim 81 further comprising procedures of:

initializing a maximum round-trip threshold.

89. A medium as set forth in claim 86 further comprising procedures of:

resetting said maximum round-trip threshold to said estimated round-trip time in the event said estimated round-trip time is greater than said maximum round-trip threshold.

90. A medium as set forth in claim 86 wherein said initializing procedure includes initializing said maximum round-trip threshold equal to an initial minimum round-trip threshold.

91. A medium as set forth in claim 81 further comprising increasing said estimated round-trip time upon an occurrence of said re-transmitting procedure.

92. A medium as set forth in claim 91 wherein said increasing procedure includes multiplying said estimated round-trip time by a predetermined coefficient.

93. A medium as set forth in claim 92 wherein said predetermined coefficient is equal to 3/2.

94. A medium as set forth in claim 78 wherein said maximum number of bytes determining procedure includes procedures of:

computing a congestion window size; and computing a difference between a number of bytes in said RTP packets currently streamed into said network and a number of bytes in said RTP packets acknowledged by said ACK packets, said maximum number of bytes being a number of bytes by which said congestion window size exceeds said difference.

95. A medium as set forth in claim 94 wherein said congestion window size computing procedure includes procedures of:

setting said congestion window size to an initial congestion window size;

varying said congestion window size constrained by a maximum congestion window size in response to receiving said ACK packets.

96. A medium as set forth in claim 95 wherein said setting procedure includes computing said initial congestion window size as a selected multiple of a maximum segment size.

97. A medium as set forth in claim 96 wherein said selected multiple of said maximum segment size is four.

98. A medium as set forth in claim 95 wherein said varying procedure includes functionally computing said congestion window size as a function of a selected one of a maximum segment size and a number of bytes in each of said RTP packets for which a respective one of said ACK packets has been received.

99. A medium as set forth in claim 98 wherein said functionally computing procedure includes increasing said congestion window size by a number of bytes in each one of said RTP packets for which a respective one of said ACK packets has been received.

100. A medium as set forth in claim 99 wherein said increasing procedure is performed only in the event of said congestion window size is presently below a slow start threshold.

101. A medium as set forth in claim 98 wherein said functionally computing procedure includes increasing said congestion window size for each full window of said ACK packets received.

102. A medium as set forth in claim 101 wherein said increasing procedure is performed only in the event said congestion window size is presently above a slow start threshold.

103. A medium as set forth in claim 95 wherein said congestion window size computing procedure further includes resetting said congestion window size to a lesser of one-half of a slow start threshold and one-half of a current congestion window size upon an occurrence of said re-transmitting procedure.

104. A medium as set forth in claim 95 wherein said varying procedure includes setting said maximum congestion window size equal to a size of a client window.

105. A medium as set forth in claim 77 wherein said re-transmitting procedure includes inserting into each of said RTP packets an expiration time, said any of said packets remaining unacknowledged not being re-transmitted in the event said expiration time is less than said predetermined time duration.

106. A medium as set forth in claim 77 wherein said maximum number of bytes determining procedure includes adding to said maximum number a number of bytes of said any of said RTP packets remaining unacknowledged after expiration of said time duration.

107. A medium as set forth in claim 77 wherein said streaming rate determining procedure includes procedures of:
  reporting by said client to said server an overbuffer window size; and
  setting said streaming rate at a rate above said rate of reading wherein said overbuffer window size is transmitted.

108. A medium as set forth in claim 107 wherein said reporting procedure includes procedures of:
  inserting into an APP packet said overbuffer window size; and
  sending by said client to said server said APP packet.

109. A medium as set forth in claim 107 wherein said streaming rate determining procedure further includes discontinuing streaming of said RTP packets when said overbuffer window is full.

110. A medium as set forth in claim 77 further comprising procedures of:
  inserting into a setup request first header information communicated to said server by said client to initiate a connection between said client and said server; and
  inserting said first header information identically into a setup response to be communicated to said client by said server.

111. A medium as set forth in claim 110 wherein said first header information includes a protocol name and at least one parameter following said protocol name.

112. A medium as set forth in claim 111 wherein said parameter includes a client window size.

113. A medium as set forth hi claim 110 further comprising procedures of:
  inserting into said setup request second header information indicative of transport options, said second header information being inserted identically into said setup response.

114. A medium as set forth in claim 113 wherein one of said options is a late tolerance option.

115. A computer system having at least one client, at least one server and a computer network, said client and said server being selectively in communication with each other over said network, said client having a buffer to store temporarily a plurality of Real-time Transport Protocol, RTP, packets streamed into said network by said server at a normal streaming rate commensurate with a rate of reading said packets by said client from said buffer, each of said RTP packets including at least a sequence number and a timestamp, said computer system comprising:
  means for acknowledging to said server each of said RTP packets received by said client;
  means for re-transmitting from said server to said client any of said RTP packets that remain unacknowledged subsequent to expiration of a predetermined time duration subsequent to said timestamp;
  means for continuously determining a maximum number of bytes that may be contained in said RTP packets streaming into said network and, in the event a number of bytes in said RTP packets exceeds said maximum number, for discontinuing streaming of said RTP packets until said number of bytes is less than said maximum number; and
  means for continuously determining a present streaming rate at which said RTP packets are streamed into said network wherein said present streaming rate exceeds said normal streaming rate.

116. A system as set forth in claim 115 wherein said acknowledging means sends from said client to said server of plurality of ACK packets in response to receiving said RTP packets.

117. A system as set forth in claim 116 wherein each of said ACK packets includes said sequence number of at least a respective one of said RTP packets received at said client.

118. A system as set forth in claim 117 wherein each of said ACK packets further include a bit mask representing an offset from said sequence number into each of ACK packets.

119. A system as set forth in claim 116 further comprising:
  means for computing said predetermined time duration as an estimated round trip time.

120. A system as set forth in claim 119 wherein said computing means measures a time period from transmission of each one of said RTP packets streamed by said server to receipt by said server of said ACK packets acknowledging each respective one of said RTP packets.

121. A system as set forth in claim 120 wherein said computing means to measure said time period marks a time of transmission for each one of said RTP packets streamed from said server and marks a time of receipt for said ACK packets acknowledging each respective one of said RTP packets, said estimated round-trip time being calculated as a function of said time of transmission and said time of receipt.

122. A system as set forth in claim 121 wherein said estimated round-trip time is calculated using Karn's algorithm.

123. A system as set forth in claim 120 wherein said time period for any one of said RTP packets having been re-transmitted prior to receipt of by said server of one of said ACK packets acknowledging said any one of said RTP packets is ignored.

124. A system as set forth in claim 119 further comprising:
  means for initializing a minimum round-trip threshold.

125. A system as set forth in claim 124 wherein said minimum round-trip threshold is reset to said estimated round-trip time in the event said estimated round-trip time is less than said minimum round-trip threshold.

126. A system as set forth in claim 119 further comprising:
  means for initializing a maximum round-trip threshold.

127. A system as set forth in claim 126 wherein said maximum round-trip threshold is reset to said estimated round-trip time in the event said estimated round-trip time is greater than said maximum round-trip threshold.

128. A system as set forth in claim 126 wherein said maximum round-trip threshold is initialized to equal to an initial minimum round-trip threshold.

129. A system as set forth in claim 119 wherein said estimated round time is increased in response to an occurrence of re-transmitting said any one of said RTP packets.

130. A system as set forth in claim 129 wherein said estimated round-trip time is multiplied by a predetermined coefficient.

131. A system as set forth in claim 130 wherein said predetermined coefficient is equal to 3/2.

132. A system as set forth in claim 116 wherein said maximum number of bytes determining means further computes each of a congestion window size and a difference between a number of bytes in said RTP packets currently streamed into said network and a number of bytes in said RTP packets acknowledged by said ACK packets, said maximum number of bytes being a number of bytes by which said congestion window size exceeds said difference.

133. A system as set forth in claim 132 wherein said congestion window size is set to an initial congestion window size and subsequently varied in response to receiving said ACK packets, said congestion window size being constrained by a maximum congestion window size.

134. A system as set forth in claim 133 wherein said initial congestion window size is a selected multiple of a maximum segment size.

135. A system as set forth in claim 134 wherein said selected multiple is four.

136. A system as set forth in claim 133 wherein said congestion window size is varied as a function of a selected one of a maximum segment size an a number of bytes in each of said RTP packets for which a respective one of said ACK packets has been received.

137. A system as set forth in claim 136 wherein said function increases said congestion window size by a number of bytes in each one of said RTP packets for which a respective one of said ACK packets has been received.

138. A system as set forth in claim 137 wherein said function is operative only in the event of said congestion window size is presently below a slow start threshold.

139. A system as set forth in claim 136 wherein said function increases said congestion window size for each full window of said ACK packets received.

140. A system as set forth in claim 139 wherein said function is operative only in the event said congestion window size is presently above a slow start threshold.

141. A system as set forth in claim 133 wherein said congestion window size is reset to a lesser of one-half of a slow start threshold and one-half of a current congestion window size upon an occurrence of said any of said RTP packets being re-transmitted.

142. A system as set forth in claim 133 wherein said maximum congestion window size is equal to a size of a client window.

143. A system as set forth in claim 115 wherein each of said RTP packets includes an expiration time, said any of said packets remaining unacknowledged not being re-transmitted in the event said expiration time is less than said predetermined time duration.

144. A system as set forth in claim 115 wherein said maximum number of bytes includes a number of bytes of said any of said RTP packets remaining unacknowledged after expiration of said time duration.

145. A system as set forth in claim 115 wherein said streaming rate determining means includes:
 means reporting by said client to said server an overbuffer window size; and
 said server in response to said reporting means setting said streaming rate at a rate above said rate of reading wherein said overbuffer window size is transmitted.

146. A system as set forth in claim 145 wherein said reporting means inserts into an APP packet said overbuffer window size, and sends said APP packet to said server.

147. A system as set forth in claim 145 wherein said streaming rate determining means discontinues streaming of said RTP packets when said overbuffer window is full.

148. A system as set forth in claim 115 further comprising:
 means for sending a setup request communicated to said server by said client to initiate a connection over said network, said setup request including first header information; and
 means for sending a setup response communicated to said client by said server, said setup response including said first header information.

149. A system as set forth in claim 148 wherein said first header information includes a protocol name and at least one parameter following said protocol name.

150. A system as set forth in claim 149 wherein said parameter includes a client window size.

151. A system as set forth in claim 148 wherein said setup request includes second header information indicative of transport options, said second header information being inserted identically into said setup response.

152. A system as set forth in claim 151 wherein one of said options is a late tolerance option.

\* \* \* \* \*